(12) United States Patent
Seaton et al.

(10) Patent No.: US 12,146,768 B2
(45) Date of Patent: Nov. 19, 2024

(54) TWO-AXIS BRACKET ASSEMBLY WITH SMART LINEAR ACTUATORS AND REMOTE SMART CONTROLLER

(71) Applicant: Seaton Automation LLC, Arlington, TX (US)

(72) Inventors: Ernest J. Seaton, Fort Worth, TX (US); Phil Gappa, Medford, OR (US); Les Strickland, Mansfield, TX (US)

(73) Assignee: Seaton Automation LLC, Fort Worth, TX (US)

( * ) Notice: Subject to any disclaimer, the term of this patent is extended or adjusted under 35 U.S.C. 154(b) by 527 days.

(21) Appl. No.: 17/210,229

(22) Filed: Mar. 23, 2021

(65) Prior Publication Data

US 2021/0302210 A1 Sep. 30, 2021

Related U.S. Application Data

(60) Provisional application No. 63/000,080, filed on Mar. 26, 2020.

(51) Int. Cl.
*G01D 11/30* (2006.01)
*F16M 11/10* (2006.01)
(Continued)

(52) U.S. Cl.
CPC ............ *G01D 11/30* (2013.01); *F16M 11/10* (2013.01); *F16M 11/205* (2013.01); *F16M 13/02* (2013.01); *G08G 1/0116* (2013.01)

(58) Field of Classification Search
CPC ...... G01D 11/30; F16M 11/10; F16M 11/205; F16M 13/02; G08G 1/0116
See application file for complete search history.

(56) References Cited

U.S. PATENT DOCUMENTS 6,025,799 A * 2/2000 Ho .................... H01Q 3/40
342/373
10,511,090 B2 12/2019 Clifford et al.
(Continued)

FOREIGN PATENT DOCUMENTS

CN 1792617 A * 6/2006 ......... B60C 23/0408

OTHER PUBLICATIONS

Juan Guerrero-Ibáñez, et al., Sensor Technologies for Intelligent Transportation Systems, Sensors, Apr. 16, 2018, p. 1212, vol. 18, MPDI.com.

*Primary Examiner* — James J Yang
*Assistant Examiner* — Anthony D Afrifa-Kyei
(74) *Attorney, Agent, or Firm* — Timothy G. Ackermann (57) ABSTRACT

A 2-axis bracket assembly with smart linear actuators forms a mount for one or more sensors, and is controllable via a remote smart controller for the actuators, which may in turn be controlled by a remote PC and may control multiple 2-axis bracket assemblies. A two-axis gimballed support is mounted to an elevated structure, and a sensor is fixed thereto. The gimballed support includes a gimbal assembly, and a bracket to mount the assembly on a pole, a bracket assembly to hold the sensor. The gimbal assembly connects the pole bracket to the sensor bracket, permitting two-axis motion therebetween. Two smart linear actuators, one connecting the pole bracket to the gimbal assembly, and one connecting the sensor bracket to the gimbal assembly control the position of the sensor bracket and the sensor.

16 Claims, 8 Drawing Sheets

(51) Int. Cl.
    *F16M 11/20*     (2006.01)
    *F16M 13/02*     (2006.01)
    *G08G 1/01*     (2006.01)

(56)         References Cited

U.S. PATENT DOCUMENTS

10,944,169 B2    3/2021   Clifford et al.
2017/0045807 A1*  2/2017   Ye ..................... F16M 11/2021

* cited by examiner

TWO-AXIS BRACKET ASSEMBLY WITH SMART LINEAR ACTUATORS AND REMOTE SMART CONTROLLER

BACKGROUND OF THE INVENTION

Owners and managers of roads mount traffic monitoring readers on various poles or other elevated structures, such as telecommunications towers, or highway gantries, to read traffic on the adjacent roads. These readers must be precisely mounted and aligned toward specific traffic lanes to accurately detect and capture analytic data for the vehicles passing by.

These readers can come out of that precise alignment due to many variables like weather, wind, etc. When the reader becomes out of alignment, the monitored data is not available and can cause revenue loss, increased labor and equipment expenses, and increased safety risks.

The monitored data is used in tollway applications to determine what the specific cost will be to travel on the certain stretch of road. When the reader is out of alignment, inaccurate date can cause possible loss of revenue. To remedy this misalignment, a crew of several workers must visit the site with a bucket truck and make the necessary realignment changes. This additional labor causes loss of revenue, and may require closing down lanes, thereby causing traffic backup. Further, this work exposes workers to vehicles in or adjacent to the roadway.

SUMMARY OF THE INVENTION

An embodiment of the present invention includes a 2-axis bracket assembly with smart linear actuators, forming a mount for one or more sensors, and a remote smart controller. Linear actuators are also known as "linacs" and are controllable to change length in a linear manner. Smart linear actuators may be IP66 rated. A single smart controller can control multiple bracket assemblies, including up to six such assemblies, by independently controlling the smart actuators of the respective assemblies. The bracket assemblies drive and position an antenna such as a traffic monitoring reader. In addition to an antenna, other readers could be mounted to the bracket assembly for remote operation. The antenna could be replaced with other signal receivers, signal transmitters, and/or signal transceivers. Potential uses include reflectors, RFID, lights, cameras.

The bracket and actuators replace the original mechanical-only mounts and may be mounted in the existing location to reduce installation or design work. The remote smart controller is mounted at the base of the pole, or other location. Dedicated control cables connect the actuators to the smart controller, routed through the conduit below the controller, and come out of the pole through nipples near the assembly.

The new design allows a person to connect their laptop to the smart controller locally, or remotely via a network connection. The smart controller hosts a custom internal web page GUI which allows the person to operate the smart bracket and actuator assembly to direct the antenna to the desired positioning.

The smart actuators can be configured through software to set or view certain critical parameters like, soft start, soft stop, speed, etc. for allowing precise adjustments. The software will convert the length (e.g. mm) of stroke from the actuators into the azimuth and altitude in degrees of the mount, which may be the position of the sensor supported by and/or fixed to the mount. The GUI can then display feedback of the azimuth and altitude in degrees.

Controlling the smart bracket assembly locally or remotely provides many benefits, including: reducing safety risk caused by working in the traffic area; reducing traffic backups by not having to shut down a lane; reducing maintenance demands and costs, as a full crew and bucket truck are not required to visit the site; and reducing device downtime and revenue loss by making realignment of the reader easier and faster.

In an embodiment, a controllable sensor system includes: a two-axis gimballed support, and a sensor fixed to the gimballed support and having its positioning controlled thereby; the gimballed support comprising a gimbal assembly, a pole mount bracket assembly, a sensor bracket assembly, the gimbal assembly connecting the pole mount bracket assembly to the sensor bracket assembly and permitting two-axis motion therebetween, the gimballed support including a pole linear actuator connecting the pole mount bracket assembly to the gimbal assembly, and an antenna linear actuator connecting the sensor bracket assembly to the gimbal assembly. The system may also include a remote controller system removably connectable to the linear actuators to control the linear actuators.

In an embodiment, a system for controlling multiple sensor platforms for use in an environment having a pole located close to a road, includes a plurality of remotely controllable sensor mounts, each of the mounts including: an antenna bracket assembly; a support permitting the antenna bracket assembly to move about a first axis and about a second axis relative to the pole; a first actuator and a second actuator; the first actuator controlling movement of the antenna bracket assembly about the first axis; and the second actuator controlling movement of the antenna bracket assembly about the second axis; and a smart controller capable of remotely controlling each of the remotely controllable sensor mounts.

In an embodiment, a controllable traffic sensor system for use in an environment having a pole located close to a road, includes: a traffic monitoring reader; a support permitting the reader to move about a first axis and about a second axis relative to the pole; a first actuator controlling movement about the first axis; a second actuator controlling the reader movement about the second axis; and a smart controller capable of controlling the first and second actuators. In an embodiment, the system also includes the first and second actuators each including a linear actuator being capable of being configured through software and providing electronic feedback to the smart controller. In an embodiment, the system also includes: a pole mount assembly, or elevated structure mount, capable of attaching the support in an elevated position on a pole or other elevated structure; an antenna mounting bracket; the reader is fixed to the antenna mounting bracket and has its movement controlled thereby; a gimbal assembly connecting the pole mount assembly to the antenna mounting bracket and permitting two-axis motion therebetween. In an embodiment, the system also includes: the pole mount assembly supporting the gimbal assembly; and the gimbal assembly supporting the antenna mounting bracket. In an embodiment, the system also includes: the first actuator connecting the pole mount assembly to the gimbal assembly; and the second actuator connecting the gimbal assembly to the antenna mounting bracket.

In an embodiment, a system for controlling one or more sensor platforms in an environment having an elevated structure close to a road, includes: at least one remotely controllable sensor mount, the mount including: a two-axis gimballed support; an antenna bracket assembly; the gimballed support permitting the antenna bracket assembly to move about a first axis and about a second axis; a first actuator and a second actuator; the first actuator controlling movement of the antenna bracket assembly about the first axis; and the second actuator controlling movement of the antenna bracket assembly about the second axis. In an embodiment, the system also includes: a smart controller capable of remotely controlling the first and second actuators. In an embodiment, the system also includes: the first and second actuators each include a linear actuator. In an embodiment, the system also includes: a smart controller; and the first and second actuators each including a linear actuator capable of being configured through software and providing electronic feedback to the smart controller. In an embodiment, the system also includes: a traffic monitoring reader fixed to the antenna mounting bracket and having its movement controlled thereby. In an embodiment, the system also includes: a mount (or supporting mount) to support the gimballed support in an elevated position; and the antenna mounting bracket supported by the gimballed support. In an embodiment, the system also includes: the gimballed support further comprising a gimbal assembly; and the gimbal assembly connecting the mount to the antenna mounting bracket and permitting two-axis motion therebetween. In an embodiment, the system also includes: the first actuator connecting the mount to the gimbal assembly; and the second actuator connecting the gimbal assembly to the antenna mounting bracket. In an embodiment, the system also includes: the mount including a pole mount assembly. In an embodiment, the system also includes: between two and six remotely controllable sensor mounts; and the smart controller capable of remotely controlling the first and second actuators of each of the remotely controllable sensor mounts.

In an embodiment, a method of controlling one or more sensor platforms in an environment having an elevated structure close to a road includes: permitting an antenna bracket assembly to move about a first axis and about a second axis of a two-axis gimballed support of at least one remotely controllable sensor mount; and using a first actuator to control the antenna bracket assembly movement about the first axis; and using a second actuator to control the antenna bracket assembly movement about the second axis. In an embodiment, the method also includes remotely controlling the first and second actuators using a smart controller. In an embodiment, the method also includes the first and second actuators each comprising a linear actuator capable of being configured through software and providing electronic feedback to a controller. In an embodiment, the method also includes controlling the movement of a traffic monitoring reader fixed to the antenna mounting bracket. In an embodiment, the method also includes: supporting the gimballed support in an elevated position on a mount; and supporting the antenna mounting bracket on the gimballed support. In an embodiment, the method also includes: activating the first actuator to move a gimbal assembly relative to the mount; and activating the second actuator to move the antenna mounting bracket relative to the gimbal assy. In an embodiment, the method also includes: the mount comprising a pole mount assembly. In an embodiment, the method also includes: the first and second actuators each including a linear actuator. In an embodiment, the method also includes: remotely controlling between two and six remotely controllable sensor mounts using a smart controller.

DETAILED DESCRIPTION

Referring to FIGS. 1A-1B, 2A-2C, 4A-4D, 5A-5B, & 6A-B, controllable sensor mount 1 includes gimballed support 2, and antenna 9 (e.g. a traffic monitoring reader). Controllable sensor mount 1 may be mounted on pole 3 at pole mounting point 4 via straps 10 and pole bracket 55 of pole mount bracket assembly 50. In another embodiment, multiple controllable sensor mounts 1 may be mounted on pole 3 at pole mounting points 4 via straps 10 and pole bracket 55 of pole mount bracket assembly 50. Remote controller 6 is attached at or near base of pole 3 and is connected to sensor mount 1 via cabling 5 which permits control signals 12 from controller 6 to controllable sensor mount 1 and electronic feedback 11 back to controller 6. Remote controller 6 is controllable via connection 7 by user laptop 8. An industrial control panel enclosure may be made out of fiberglass and be NEMA 4x rated and keypad lockable. Gimballed support 2 comprises gimbal assembly 20, connected to pole mount bracket assembly 50, and antenna linac 30 and pole linac 40. The gimballed smart controller bracket may be manufactured with powder-coated steel, zinc-plated steel and/or stainless steel, and with such parts as PTFE bushings.

Referring to FIGS. 1A-1B, 2A-2C, & 3, gimbal assembly 20 includes axle bracket 21 connecting pole axle 22 to antenna axle mounts 24. Antenna axle mounts 24 rotatably support antenna axle 23, which is fixed to and supports antenna mounting bracket 25. Antenna 9 is attached to gimbal assembly 20 at antenna mounting bracket 25, and will normally have its movement and positioning controlled thereby. Gimbal assembly 20 also includes antenna linac anchor assembly 26 and providing mounting pin 27 for antenna linac 30, and antenna linac driven assembly 28 with pin 27, fixedly mounted to antenna mounting bracket 25 to move antenna mounting bracket 25. Antenna linac anchor assembly 26 is rotatably mounted on pole axle 22 but only rotatable in an axis provided by pole axle 22 with pin 27 transverse to the axis of rotation. Gimbal assembly 20 is rotatably mounted at pole axle 22 to pole mount bracket assembly 50, permitting gimbal assembly 20 to rotate in a first axis about pole axle 22. Antenna axle bushings 17 reside inside antenna axle mounts 24 and allow for smooth rotation of antenna axle 23, and permitting antenna mounting bracket 25 to rotate in a second axis about antenna axle 23. Antenna axle collars 18 are clamped to antenna axle 23 and fixedly mounted to antenna mounting bracket 25, coupling the two together. Thus, the combination of rotation in two axes about pole axle 22 and antenna axle 23 means there are two degrees-of-freedom between pole bracket 55 and antenna mounting bracket 25.

Pole mount bracket assembly 50 includes pole axle brackets 51 connecting pole bracket 55 to pole axle mounts 54, which each are rotatably mounted to pole axle 22 and permit pole axle 22 to rotate thereabout on its long axis. Pole mount bracket assembly 50 also includes pole linac anchor assembly 58 fixedly mounted to pole bracket 55 providing mounting pin 59 for pole linac 40, and pole linac driven assembly 56 with pin 57, rotationally fixed to pole axle 22 to drive gimbal assembly 20. Clamp 53 prevents gimbal assembly 20 from sliding out of pole mount bracket assembly 50 with pin 57 parallel to the axis of rotation of pole axle 22. Pole bushings 60 reside inside pole axle mounts 54 and allow for smooth rotation of pole axle 22 therein. Pole washer 52 sits below the bottom pole axle mount 54 to prevent rubbing between the bottom pole axle mount 54 and axle bracket 21. Thus, pole bracket 55 of pole mount bracket assembly 50 supports gimballed support 2, in an elevated position on pole 3. In other embodiments, not shown, pole bracket 55 and pole mount bracket assembly 50 may be adapted to attach to highway gantries, towers, or the like.

Antenna linac 30 includes linac body 35 (including electronics, transceivers, battery, etc., not shown), and on each end, an actuator link assemblies 31 to provide linear actuation from linac body 35, including driven pins 32 and mounting pin receivers 33 transverse to the long axis of each of driven pins 32.

Pole linac 40 is the same as antenna linac 30, with reference numbers incremented by 10, including linac body 45, actuator link assemblies 41, pins 42, & mounting pin receivers 43.

Antenna linac 30 is supported at one end by antenna linac anchor assembly 26, by pin 27 being fixed in pin receiver 33 at one end, and at the other end by antenna linac driven assembly 28, by pin 29 being fixed in pin receiver 33 at the other end.

Pole linac 40 is supported at one end by pole linac anchor assembly 58, by pin 59 being fixed in pin receiver 43 at one end, and at the other end by pole linac driven assembly 56, by pin 57 being fixed in pin receiver 43 at the other end.

Figure 1A:
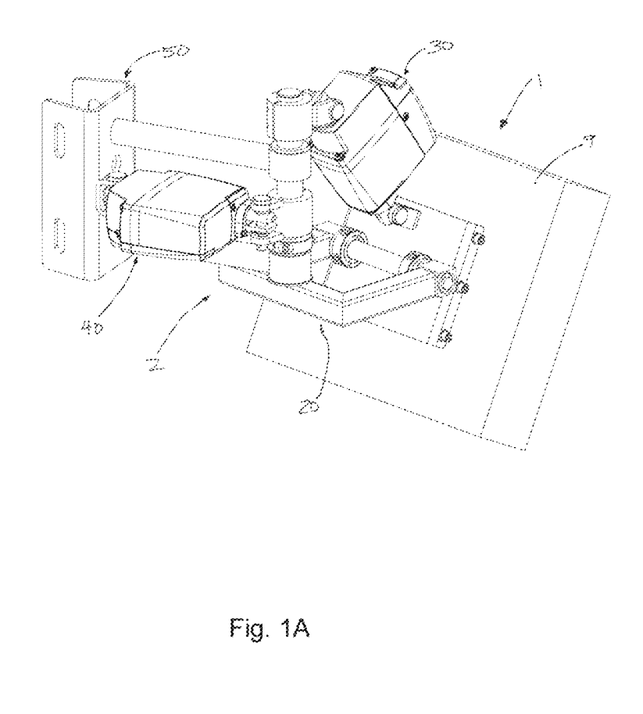
FIGS. 1A & 1B are, respectively, rear and front oblique views of an embodiment of the present invention.
Figure 1B:
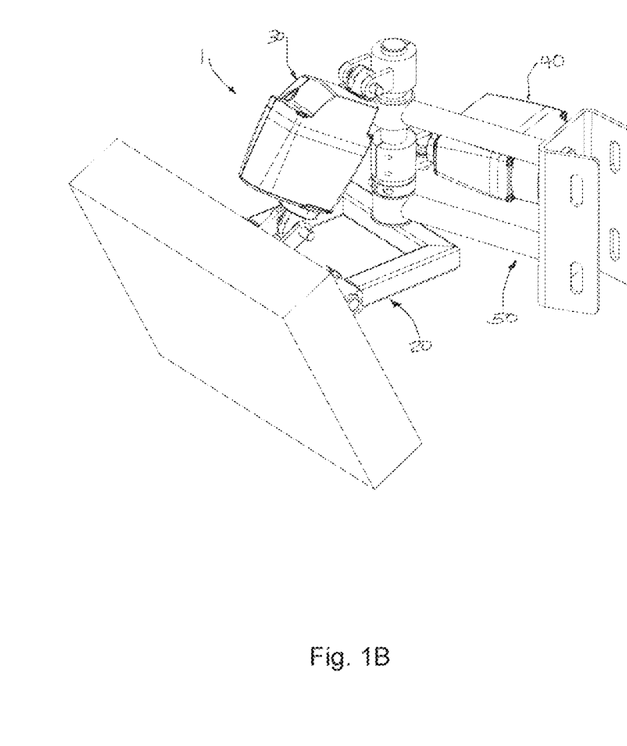
Figure 2A:
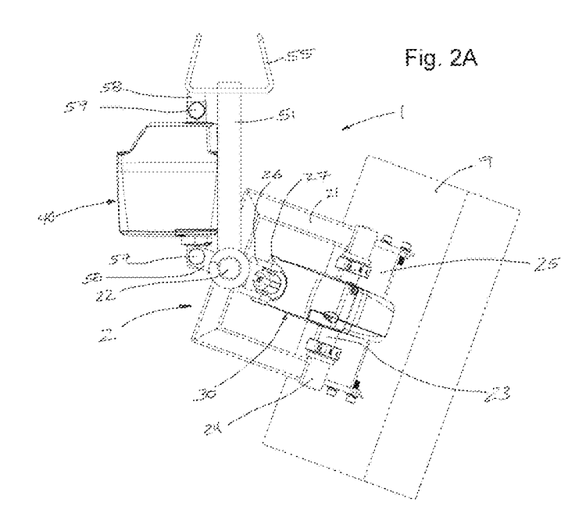
FIGS. 2A, 2B & 2C are, respectively, top, front, and left side views of an embodiment of the present invention.
Figure 2B:
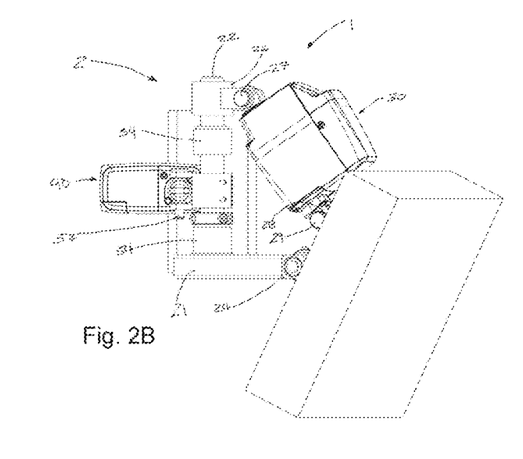
Figure 2C:
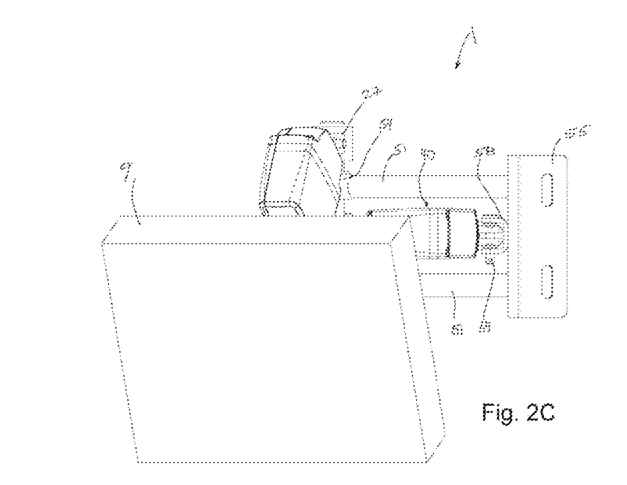
Figure 3:
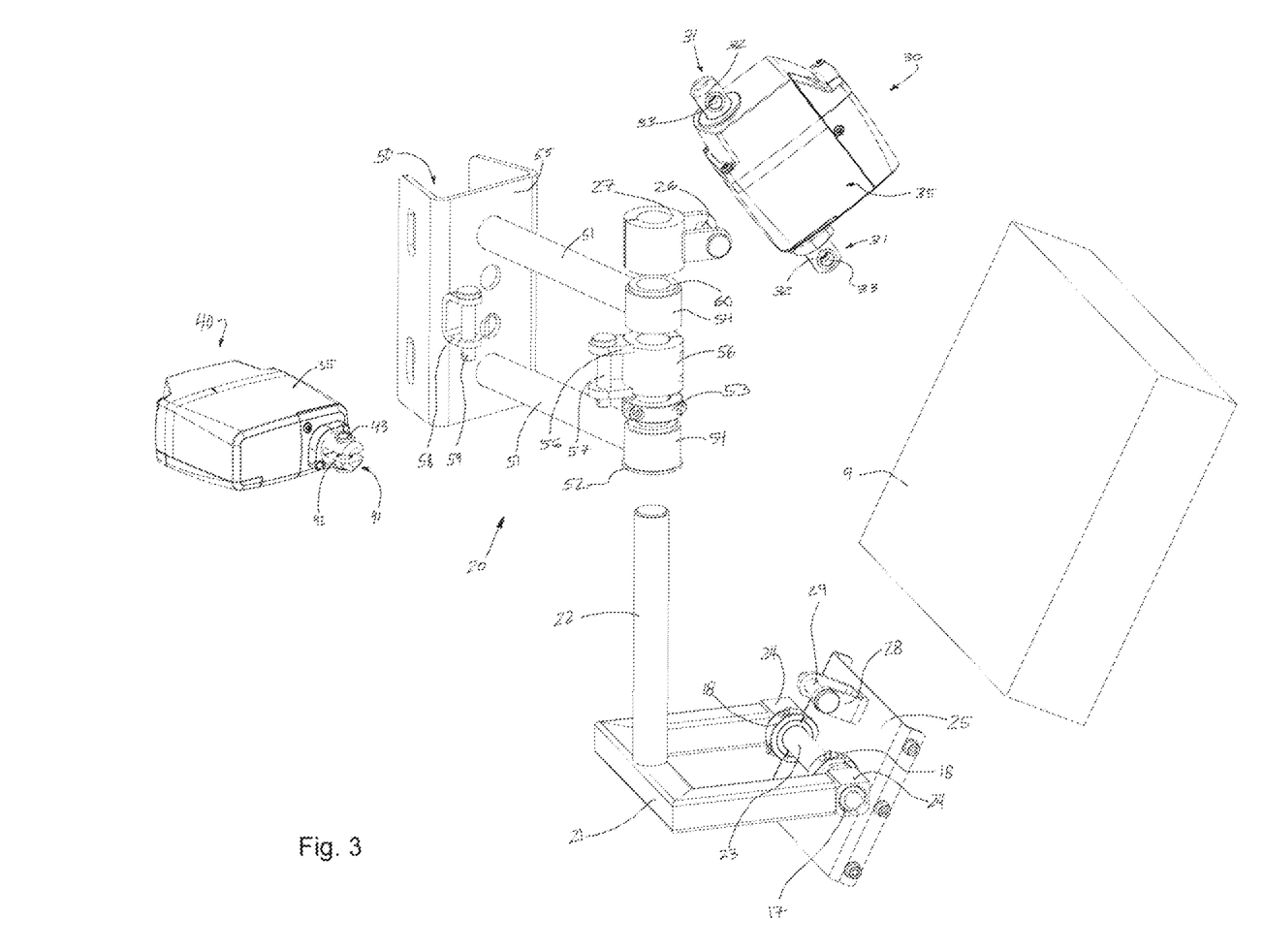
FIG. 3 is a partially exploded oblique view of an embodiment of the present invention.
Figure 4A:
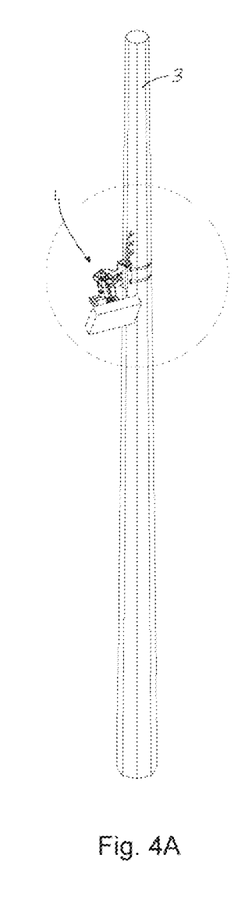
FIGS. 4A & 4B are, respectively, front and rear oblique views of an embodiment of the present invention.
Figure 4B:
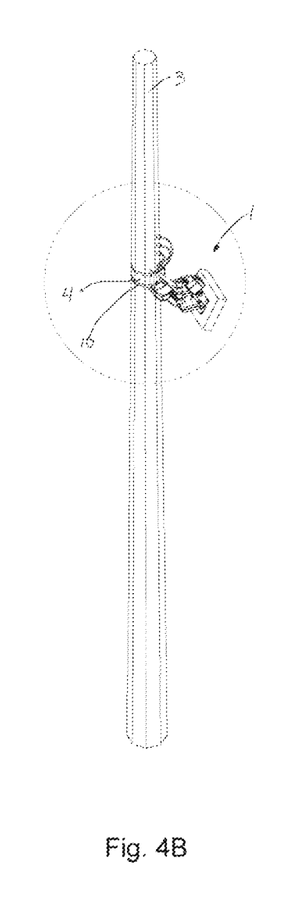
Figure 4C:
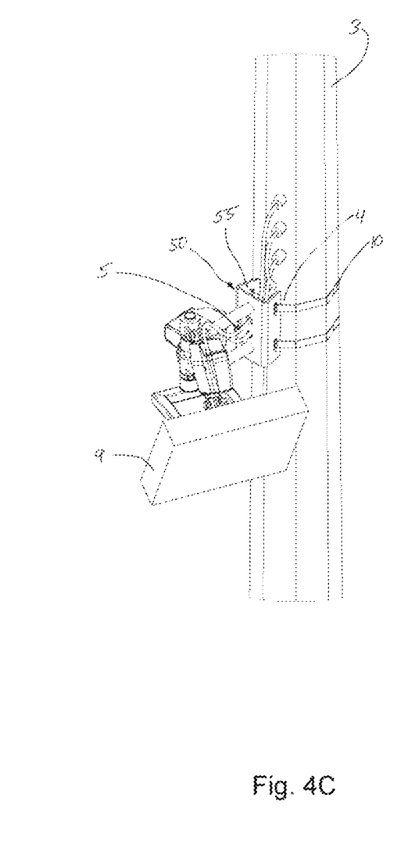
FIGS. 4C & 4D are, respectively, detail views of FIGS. 4A & 4B.
Figure 4D:
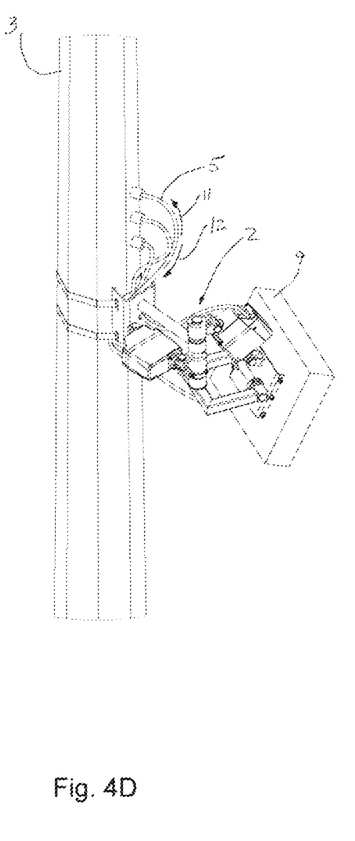
Figures 5A, 5B:
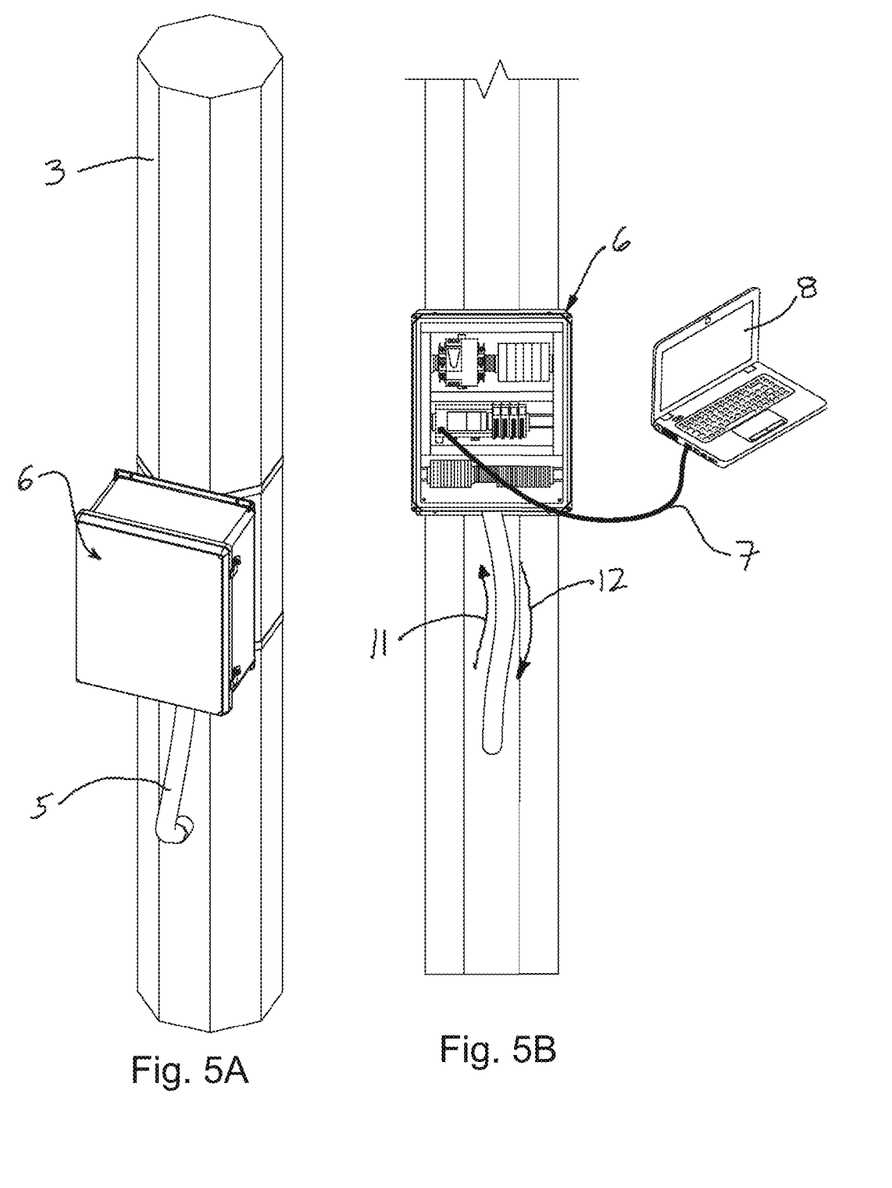
FIGS. 5A & 5B are, respectively, front oblique and front views of an embodiment of the present invention in different modes.
Figure 6A:
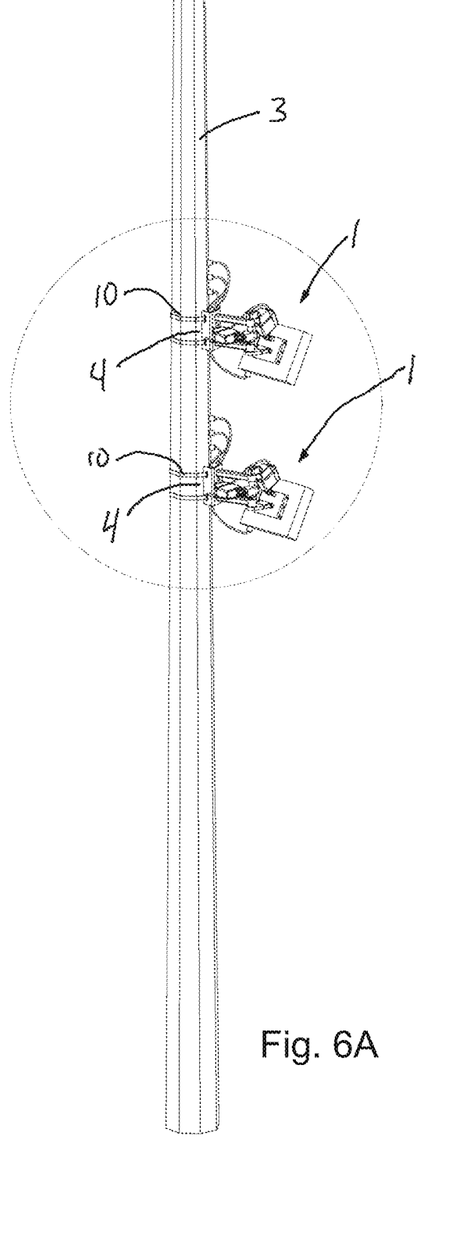
FIGS. 6A & 6B are, respectively, a rear oblique view of an embodiment of the present invention, and a detail view of FIG. 6A.
Figure 6B:
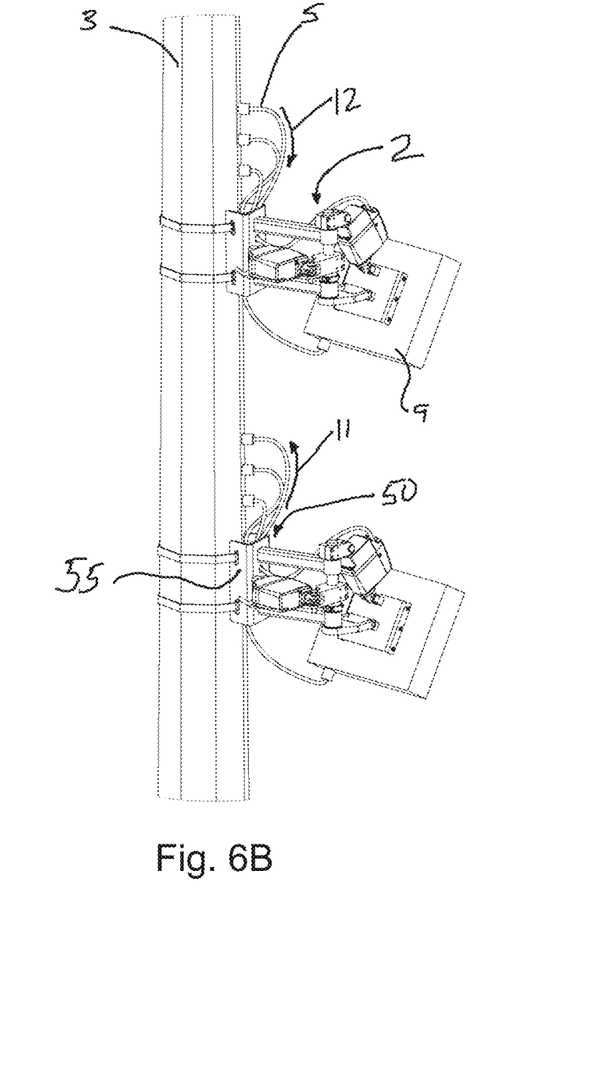
Figure 7:
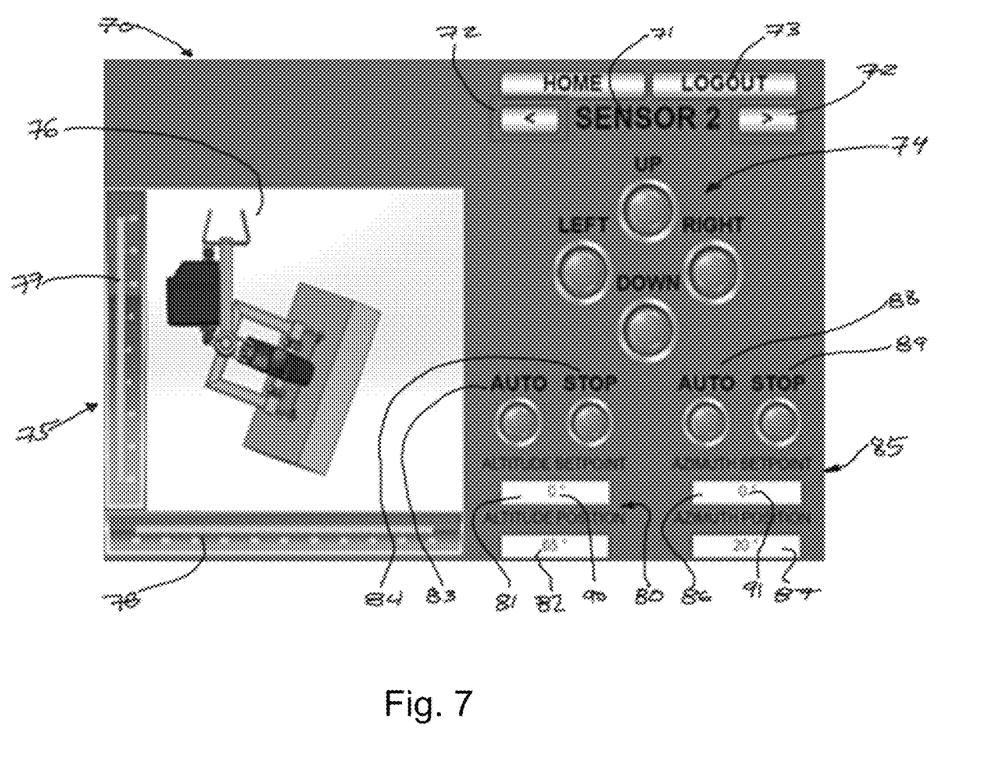
FIG. 7 shows an exemplary control panel of an embodiment of the present invention.

Referring additionally to FIGS. 5A-5B, 7, & 8, in operation, remote controller 6 may be maintained closed (as in FIG. 5A) or opened to allow connection 7 to user laptop 8, which allows the individual to operate linacs 30 and 40 to direct antenna 9 on antenna mounting bracket 25 to the desired positioning via control display 70 shown in FIG. 7.

Control display 70 includes sensor indicator 71 informing the operator which sensor mount 1 is being controlled (if the system includes more than one), left/right buttons 72, to change the selected sensor mount, logout button 73 to end operations, four-way momentary buttons 74 to permit momentary left/right & up/down motions of the selected sensor mount, GUI display 75, altitude controls 80, and azimuth controls 85. GUI display 75 includes visual position indicator 76, altitude bar-graph display 77, & azimuth bar-graph display 78. Altitude controls 80 include auto button 83 to initiate movement to a preset altitude 90 entered in altitude setpoint box 81, stop button 84 to terminate the movement, and altitude position indicator 82 displaying the current altitude textually. Azimuth controls 85 include auto button 88 to initiate movement to a preset azimuth 91 entered in azimuth setpoint box 86, stop button 89 to terminate the movement, and azimuth position indicator 87 displaying the current altitude textually.

Figure 8:
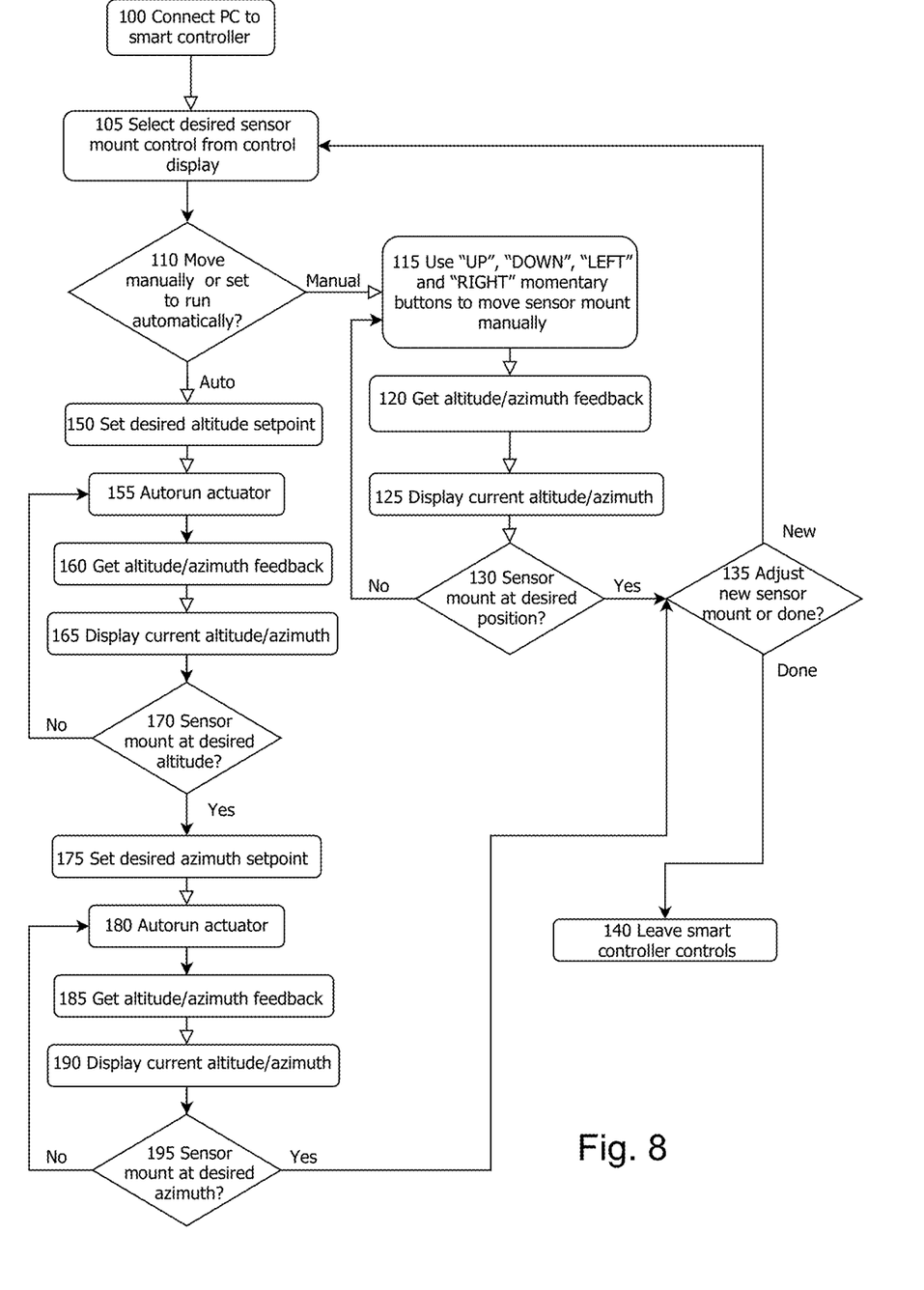
FIG. 8 describes a method of operation of an embodiment of the present invention.

To remotely control the sensor platform by controlling linacs 30, 40: step 100 is the operator connecting laptop/PC 8 to remote controller 6 to control the software for directly controlling linacs 30/40; step 105 is selecting the desired sensor mount 1 to control from control display 70 using left/right buttons 72 and with visual feedback from sensor indicator 71; step 110 is deciding to control the position manually or set to run automatically.

If manual control is chosen, step 115 is using the "UP", "DOWN", "LEFT" and "RIGHT" 4-way momentary buttons 74 to move sensor mount 1 manually by sending control signals 12 up cabling 5; step 120 is getting altitude/azimuth feedback via electronic feedback 11 down cabling; step 125 is displaying the current altitude/azimuth; step 130 is the user deciding if sensor mount 1 is at the desired position. If no, step 115 is repeated; if yes, step 135 is deciding to adjust a new sensor mount or the operator is done. If a new adjustment is desired, step 105 is repeated; if done, step 140 is leaving the smart controller 6 control display using logout button 73. Step 125 of displaying the current altitude/azimuth includes showing current altitude/azimuth in altitude position indicator 82, azimuth position indicator 87, visual position indicator 76, altitude bar-graph display 77, & azimuth bar-graph display 78.

If automatic control is chosen, step 150 is setting the desired altitude setpoint by using altitude controls 80, specifically by entering preset altitude 90 in altitude setpoint box 81; step 155 is initiating autorun by using auto button 83; step 160 is the system is getting altitude/azimuth feedback via electronic feedback 11 down cabling; step 165 is displaying the current altitude/azimuth; step 170 is the system deciding if the sensor mount is at the desired altitude by comparing preset altitude 90 to current altitude (displayed in altitude position indicator 82), if no, step 155 is continued, if yes step 175 is setting the desired azimuth setpoint by using altitude controls 85, specifically by entering preset azimuth 91 in azimuth setpoint box 86; step 180 is initiating autorun by using auto button 88; step 185 is the system is getting altitude/azimuth feedback via electronic feedback 11 down cabling; step 190 is displaying the current altitude/azimuth; step 195 is the system deciding if the sensor mount is at the desired azimuth by comparing preset azimuth 91 to current azimuth (displayed in azimuth position indicator 87), if no, step 180 is continued, if yes step 135 is repeated. Steps 165, 190 of displaying the current altitude/azimuth includes showing current altitude/azimuth in altitude position indicator 82, azimuth position indicator 87, visual position indicator 76, altitude bar-graph display 77, & azimuth bar-graph display 78.

During movement, antenna linac 30 is anchored at one end by antenna linac anchor assembly 26, thus extending or retracting actuator link assembly 31 pushes on antenna linac driven assembly 28, causing antenna mounting bracket 25 to rotate in a desired amount about the axis of antenna axle 23. And pole linac 40 is anchored at one end by pole linac anchor assembly 58, thus extending or retracting actuator link assembly 41 pushes on pole linac driven assembly 56, causing pole axle 22 to rotate, thus causing gimbal assembly 20 and antenna 9 to rotate in a desired amount about the axis of pole axle 22.

The invention claimed is:

1. A system for controlling one or more sensor platforms, comprising:
   at least one remotely controllable sensor mount, comprising
   a two-axis gimballed support;
   the two-axis gimballed support comprising a pole axle;
   an antenna mounting bracket;
   the antenna mounting bracket comprising an antenna axle;
   said gimballed support permitting said antenna mounting bracket to move about a first axis and about a second axis; and
   the pole axle on said first axis and the antenna axle on said second axis; and
   a first actuator and a second actuator;
   said first actuator controlling movement of the second actuator and the antenna mounting bracket about the first axis; and
   said second actuator controlling movement of the antenna mounting bracket about the second axis.

2. The system of claim 1, further comprising a smart controller capable of remotely controlling said first and second actuators.

3. The system of claim 1, further comprising:
   a traffic monitoring reader;
   said traffic monitoring reader fixed to the antenna mounting bracket and having its movement controlled thereby.

4. The system of claim 1, said gimballed support further comprising:
   a mount to support the gimballed support in an elevated position; and
   said antenna mounting bracket supported by said gimballed support.

5. The system of claim 4:
   said gimballed support further comprising a gimbal assembly;
   said gimbal assembly connecting said mount to said antenna mounting bracket and permitting two-axis motion therebetween.

6. The system of claim 5, further comprising:
   said first actuator connecting the mount to the gimbal assembly; and
   said second actuator connecting the gimbal assembly to the antenna mounting bracket.

7. The system of claim 4, said mount comprising a pole bracket.

8. The system of claim 1, further comprising:
   a plurality of said remotely controllable sensor mounts; and
   said smart controller capable of remotely controlling the said first and second actuators of each of said remotely controllable sensor mounts.

9. The system of claim 1:
   the pole axle fully supporting the antenna mounting bracket and the second actuator;
   the antenna axle supporting the antenna mounting bracket; and
   the second actuator connected to the antenna bracket.

10. The system of claim 9, wherein said first and second actuators each comprise a linear actuator.

11. The system of claim 1:
    the second actuator rotationally fixed about the first axis to the antenna mounting bracket.

12. A system for controlling one or more sensor platforms in an environment having an elevated structure close to a road, comprising:
    at least one remotely controllable sensor mount, comprising pole axle mounts and a pole axle oriented on a first axis;
    antenna axle mounts and an antenna axle oriented on a second axis;
    a first linear actuator and a second linear actuator;
    said second linear actuator, said antenna axle mounts, and said antenna axle fully supported on said pole axle mounts and said pole axle and able to rotate about said first axis;
    an antenna mounting bracket rotationally supported on said antenna axle mounts and said antenna axle and able to rotate about said second axis;
    the first linear actuator controlling movement of the second linear actuator and the antenna mounting bracket about the first axis; and
    said second linear actuator controlling movement of the antenna mounting bracket about the second axis.

13. The system of claim 12:
    the first actuator connected to the pole axle by a bracket to rotate the pole axle; and
    the second actuator connected to pole axle and the antenna axle by two brackets to rotate the antenna axle.

14. The system of claim 12, further comprising:
    a smart controller; and
    said linear actuators being capable of being configured through software and providing electronic feedback to said smart controller.

15. The system of claim 12, further comprising:
    a traffic monitoring reader;
    said traffic monitoring reader fixed to the antenna mounting bracket and having its movement controlled thereby.

16. The system of claim 12, further comprising:
    a plurality of said remotely controllable sensor mounts;
    a smart controller; and
    said smart controller capable of remotely controlling the said first and second linear actuators of each of said remotely controllable sensor mounts.

* * * * *